United States Patent [19]

Rudolph et al.

[11] 3,898,478

[45] Aug. 5, 1975

[54] APPARATUS FOR ACCELERATING D.C. TRANSIENT DECAY BY INDEPENDENT KEYING OF A BALANCED DEMODULATOR

[75] Inventors: John D. Rudolph, Moonachie; Joseph A. Solomon, Paramus, both of N.J.

[73] Assignee: The Bendix Corporation, Teterboro, N.J.

[22] Filed: Dec. 26, 1973

[21] Appl. No.: 428,514

[52] U.S. Cl. .................. 307/151; 328/31; 328/173; 328/99

[51] Int. Cl. .......................................... H04b 1/100

[58] Field of Search ........... 328/31, 32, 99, 173, 26, 328/28; 307/247 A; 340/365 E

[56] References Cited

UNITED STATES PATENTS

| | | | |
|---|---|---|---|
| 3,159,793 | 12/1964 | Welsh | 328/99 |
| 3,283,255 | 11/1966 | Cogar | 328/99 |
| 3,350,573 | 10/1967 | Barny | 328/99 |
| 3,551,703 | 12/1970 | Bischoff | 328/99 |

*Primary Examiner*—David Smith, Jr.
*Attorney, Agent, or Firm*—Anthony F. Cuoco; S. H. Hartz

[57] ABSTRACT

For use with analog a.c.-to-analog d.c. conversion systems or the like employing balanced demodulators for reducing settling time i.e., the interval between application of a.c. superimposed on d.c. and the provision of a d.c. analog of the superimposed a.c., means for introducing an independent keying signal to force demodulation during part of the settling time.

8 Claims, 1 Drawing Figure

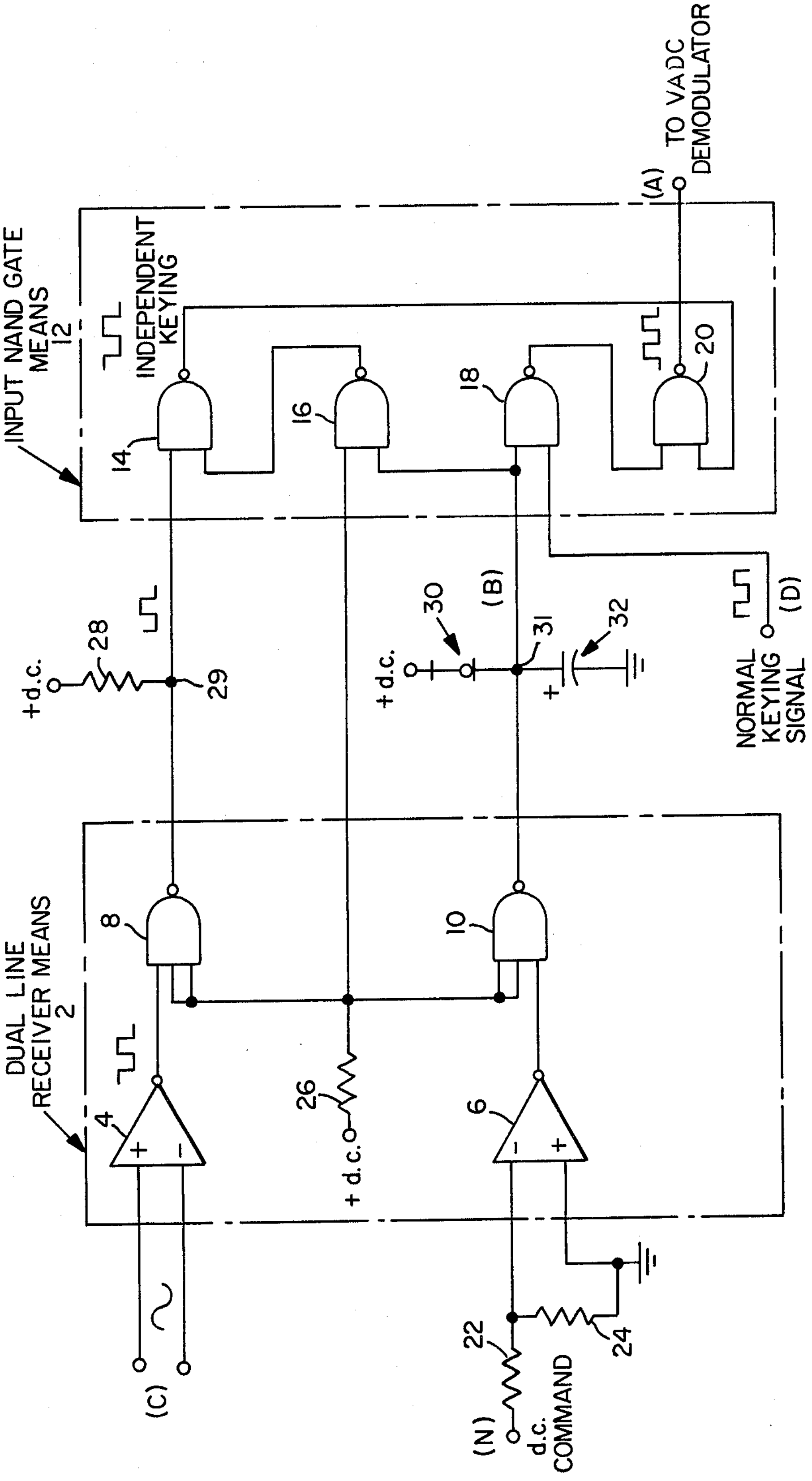
INPUT NAND GATE MEANS 12
INDEPENDENT KEYING
TO VADC DEMODULATOR
(A)
14
16
18
20
+d.c.
28
29
+d.c.
30
(B)
31
32
NORMAL KEYING SIGNAL
(D)
DUAL LINE RECEIVER MEANS 2
8
10
4
6
26
+d.c.
(C)
22
24
(N)
d.c. COMMAND

APPARATUS FOR ACCELERATING D.C. TRANSIENT DECAY BY INDEPENDENT KEYING OF A BALANCED DEMODULATOR

BACKGROUND OF THE INVENTION

1. Field of the Invention

This invention relates generally to a.c. to d.c. converters and particularly to converters of the type described including means for reducing the interval between the introduction of a composite a.c. and d.c. analog signal and the generation of a d.c. analog of the a.c. portion of the composite signal. The invention may be part of a voltage analog-to-digital converter (VADC) which processes the d.c. analog to a corresponding digital readout and will be described with reference thereto.

2. Description of the Prior Art

Voltage a.c. to d.c. converters may be of the type which include a balanced demodulator and process an analog a.c. input signal by first demodulating (rectifying) said signal and then filtering the demodulated signal to provide a d.c. output signal at a level scaled to the rms value of the input signal waveform, which is generally sinusoidal. When the input waveform includes a d.c. component, the a.c. signal is offset from the zero axis. Accurate processing of the a.c. signal can not occur until the transient effect of the d.c. component has decayed to a value approaching zero.

For design considerations, the input to the converter is capacitively decoupled from the input signal source so that any d.c. level will exist as a transient factor only. The interval measured from the instant the input signal is first applied to the converter until that signal can be processed to yield an accurate d.c. analog equivalent to the input a.c. signal waveform is called "settling time." Presently configured converters tolerate a ratio of approximately 1:16 between the settling time observed under conditions of zero d.c. offset and that observed when significant levels of d.c. offset are present.

The settling time, under all conditions, is affected by the demodulator in the converter. Under normal steady state operating conditions the a.c. input signal generates a controlling or keying signal for the demodulator. This keying signal is derived from the zero axis crossing of the a.c. signal which occurs during polarity alternations. When the a.c. signal is offset from the zero axis by the presence of a d.c. component as heretofore noted, these polarity alternations are not necessarily referenced to the zero axis and the keying signals are either not produced or produced in non-coherent patterns.

It is recognized that if an independently derived keying signal is impressed on the demodulator during the time the d.c. offset is present, then the d.c. transient level will decay rapidly and the a.c. input signal will fall into its normal range of operation. That is to say, the alternations are positioned symmetrically about the zero axis and normal a.c. signal processing occurs. It has been found that the introduction of the independent keying signal reduces the afore noted settling time ratio to 1:1.7, where the d.c. offset step level exceeds the a.c. scale limit by a factor of five.

SUMMARY OF THE INVENTION

This invention contemplates apparatus which provides an independent keying signal for keying the VADC demodulator during such time as the offset a.c. signal is outside the normal keying range. Normally the VADC is automatically prevented from digitizing analog information for a predetermined interval, 800 milliseconds for example, measured from the time that the a.c. information is received by the VADC. For a portion of this interval the apparatus of the invention supplies the demodulator with an independent keying signal at a predetermined frequency of 400 Hz, for example. This signal is non-synchronous with the a.c. input signal. After about 500 milliseconds the apparatus becomes inactive and establishes normal circuit conditions within the VADC to permit conventional a.c. to d.c. to digital processing. At the end of the 800 millisecond interval the d.c. analog, scaled to reflect the rms value of the incoming a.c. analog signal, is available for digitizing readout and/or comparison as the case may be.

The main object of this invention is to provide analog a.c.-to-analog d.c. converter of the type having a controlled interval between the application of an analog a.c. signal and the processing of that signal to provide a corresponding in-tolerance digital signal (settling time). Means are provided for generating an independent signal to reduce the interval.

Another object of this invention is to reduce the interval by introducing an independently derived keying signal for reducing the time it takes for the analog a.c. signal to fall into its normal range of operation i.e., when the alternations of the analog signal are positioned symmetrically about the zero axis and normal a.c. signal processing takes place.

Another object of this invention is to overcome the disadvantages of prior art equipment wherein, the normal keying signal is derived solely from the zero axis crossing of the analog a.c. signal which occurs during polarity alternations. When the a.c. signal is offset from the zero axis by the presence of a d.c. component, polarity alternations are not referenced to the zero axis and the keying signals are either not produced or produced in non-coherent patterns.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE in the drawing is a schematic diagram of apparatus according to the invention.

DESCRIPTION OF THE INVENTION

The apparatus of the invention is implemented by dual line receiver means 2 including a pair of differential amplifiers 4 and 6 having outputs gated by NAND gates 8 and 10, and quad 2-input NAND gate means 12 having NAND gates 14, 16, 18 and 20. The output of gate 8 is connected to an input of gate 14 and the output of gate 10 is connected to inputs of gates 16 and 18.

A voltage divider including resistors 22 and 24 is connected to differential amplifier 6 in dual line receiver means 2. A d.c. system command signal is received at a circuit node (N) and applied through said resistors 22 and 24 to amplifier 6.

A d.c. energizing voltage (+5V d.c., for example) is applied through a resistor 26 to dual inputs of gates 8, 10 and to an input of gate 16; applied through a resistor 28 to a point 29 between the output and input of gates 8 and 14, respectively; and applied through a constant current diode 30 to a point 31 between the output of gate 10 and inputs of gates 16 and 18. A grounded timing capacitor is connected to point 31.

The output of gate 16 is connected to an input of gate 14 and the output of gate 18 is connected to an input of gate 20. The output of gate 14 is connected to an input of gate 20.

An output signal is provided at circuit node (A), and which circuit node (A) is at the output of gate 20. This output signal may be either the normal keying signal derived from the input analog a.c. signal or, alternately, an independent keying signal as will be hereinafter described, and which keying signals are applied to a VADC demodulator. The independent keying signal is derived from input power applied at circuit node (C), and which input power has been filtered and conditioned to provide a 400 cycle sinusoidal signal at an rms amplitude of, for example, from 1.5 to 2.2 volts at the differential input terminals of amplifier 4.

The normal keying signal is applied at circuit node (D) and functions to generate useful keying signals derived from the analog input signal when steady state or near steady state conditions exist i.e., when the d.c. transient has decayed to near null conditions.

Prior to the time that the analog signal is received by the VADC, node (N) will be in a state of +15 volts indicating that a predetermined code has been programmed in terms of particular machine language. At this time the voltage divider including resistors 22 and 24 provides a signal of 500 mv, for example, at the input terminals of differential amplifier 6 to drive the amplifier output "high." The high signal thus applied to gate 10, together with the two high signals received thereby from the +5 volt, d.c. energizing signal applied through resistor 26 provides a "low" at the output of gate 10 thereby shorting timing capacitor 32. At the same time, the 400 Hz, sinusoidal signal at node (C) is impressed on differential amplifier 4 and the amplifier generates a square wave output which is inverted by gate 8 and applied to an input terminal of gate 14.

The output terminal of gate 16 is at this time high because of the low state of the signal at circuit node (B) developed due to the low output of gate 10 as heretofore noted. The output state of gate 18 is similarly high because of the low state of circuit node (B) appearing at one of its input terminals. Thus, gate 20 is enabled by inputs from gate 14 and 18 to provide the independent keying signal at node (A).

However, the predetermined code received at node (N) interrupts the circuit between the signal source that produces the VADC a.c. input signal and the input terminals of the VADC. Those keying signals at node (A) will key the VADC demodulator as earlier noted, but normal signal processing will not occur since the a.c. signals are not present.

The a.c. signal information is received by the VADC by programming a removal code at node (N). Once this is achieved node (N) switches to, for example, −12 volts. The polarity of the signal impressed upon the input terminals of differential amplifier 6 is reversed, thus allowing the output of the amplifier to go low and to thereby remove the short circuit path that heretofore shunted capacitor 32. Initially the output of gate 18 remains high since, because of the finite charging time of capacitor 32, node (B) remains low. The normal keying signal at node (D) is thus inhibited, and the independent keying signal output continues to appear at node (A).

Now, however, the a.c. input signal information is available for processing in the VADC demodulator. Should the a.c. signal contain a positive or negative d.c. offset, it will be forced to decay by the switching action of the demoducator. During this time capacitor 32 charges at a rate controlled by constant current source 30 allowing node (B) to go high. The high condition at node (B) forces the output of gate 16 to go low, which in turn disables gate 14 so that the gate can not provide the auxiliary keying signal. This causes output of gate 14 to go to a steady state high condition. The normal keying signal generated by the incoming a.c. signal now appears at node (A) and normal VADC processing takes place.

In implementation, capacitor 32 and its peripheral devices i.e., constant current device 30 and the associated amplifiers and gates, are selected to permit charging in approximately 500 milliseconds from the time the removal code is applied to node (N). Implementation of the invention as described is based on the selection of commercially available components. For example, dual line receiver means 2 may be of the type manufactured by the Fairchild Instrument Company and carrying their trade designation, Fairchild 55108, and input NAND gate means 12 may be a Fairchild device and carrying the trade designation, Fairchild 5400. Constant current source 30 may be manufactured by Siliconix, Inc. and carrying their trade designation CL2210 and capacitor 32 may be of the standard one microfared, 10 volt capacitor commercailly available. The VADC demodulator referenced herein may be of the type manufactured by the Navigation & Control Division of The Bendix Corporation, Teterboro, N.J., and carrying their trade designation QB585937.

It will now be seen from the aforenoted description of the invention that the heretofore enumerated objects have been met. An independent keying signal is generated which reduces the settling time as heretofore defined. The VADC demodulator is keyed during such time as the offset a.c. is outside the normal keying range. The invention thus functions to recognize that the VADC has been commanded to process a.c. information and enables the VADC to provide an in-tolerance digital output corresponding to the a.c. input signal.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a system of the type for converting an analog signal having an a.c. component and a transient d.c. component to an analog d.c. signal corresponding to the a.c. component, wherein the a.c. component is offset from the zero axis for an interval during which the transient a.c. component decays to near zero, and including a demodulator controlled by a controlling signal derived from the zero axis crossing of the a.c. component for demodulating said a.c. component, the improvement comprising:

means for providing an independent controlling signal for controlling the demodulator to demodulate the a.c. component during part of the interval;

said means including means responsive to a system command signal for providing a first signal at one logic level, means responsive to the first signal for providing a second signal at an opposite logic level, means for providing a signal having a predetermined waveform, means responsive to the second signal at the opposite logic level for providing third and fourth signals at the one logic level, means responsive to the predetermined waveform signal and the third signal at the one logic level for providing a fifth signal, and means responsive to the fourth signal at the one logic level and the fifth signal for providing the independent controlling signal.

2. The improvement as described by claim 1, wherein:

the independent controlling signal is non-synchronous with the a.c. component.

3. The improvement as described by claim 1, wherein the means responsive to the first signal for providing a second signal at an opposite logic level includes:

means for providing a reference signal at the one logic level; and first gating means having first and second inputs connected to the reference signal means and a third input connected to the first signal providing means and responsive to the signals therefrom for providing the second signal at an output.

4. The improvement as described by claim 3, wherein the means responsive to the second signal at the opposite logic level for providing third and fourth signals at the one logic level includes:

second gating means having first and second inputs connected to the reference signal means and to the gating means, respectively, and responsive to the signals therefrom for providing the third signal at an output; and third gating means having a first input connected to the first gating means and a second input connected to the system and responsive to the second signal and the controlling signal for providing the fourth signal at an output.

5. The improvement as described by claim 4, wherein the means responsive to the predetermined waveform signal and the third signal at the one logic level for providing a fifth signal includes:

fourth gating means having a first input connected to the predetermined waveform signal means and a second input connected to the second gating means, and responsive to the signals therefrom for providing the fifth signal at an output.

6. The improvement as described by claim 4, wherein the means responsive to the fourth signal at the one logic level and the fifth signal for providing the independent controlling signal includes:

fifth gating means having a first input connected to the third gating means and a second input connected to the fourth gating means, and responsive to the signals therefrom for providing the independent controlling signal.

7. The improvement as described by claim 1, including:

the means responsive to a system command signal for providing a first signal at one logic level being responsive to another command signal for providing the first signal at the opposite logic level;

the means responsive to the first signal being responsive to said signal at the opposite logic level for providing the second signal at the one logic level;

time delay means connected to the second signal providing means and to the third and fourth signal providing means for affecting the response of the third and fourth signal providing means to the second signal at the one logic level so that the third and fourth signals are at the opposite logic level after an interval; and the means responsive to the predetermined waveform signal and to the third signal being inhibited by the third signal at the opposite logic level for providing the fifth signal.

8. The improvement as described by claim 7, including:

means connected to the time delay means for controlling the interval.

* * * * *